United States Patent [19]

Meigs

[11] 4,367,993
[45] Jan. 11, 1983

[54] TRUCK LOAD BINDER TIGHTENER

[76] Inventor: William M. Meigs, 121 S. Drive, Pittsburgh, Pa. 15238

[21] Appl. No.: 194,760

[22] Filed: Oct. 6, 1980

[51] Int. Cl.³ .............................................. B60P 7/008
[52] U.S. Cl. .................................... 410/103; 254/221; 254/223; 410/47
[58] Field of Search ................ 254/213, 221, 223, 224, 254/242, 311, 358, 373; 52/149; 74/575, 577 R, 577 M, 529, 532, 535, 536, 537, 543, 545; 410/101, 103, 104, 106, 107, 47

[56] References Cited

U.S. PATENT DOCUMENTS

| | | | |
|---|---|---|---|
| 3,193,253 | 7/1965 | Ratcliff et al. | 254/242 X |
| 3,633,937 | 1/1972 | Hlinsky | 410/103 |
| 3,679,175 | 7/1972 | Drayton | 410/103 X |
| 3,697,045 | 10/1972 | Farley | 410/103 |
| 3,740,073 | 6/1973 | Schwiebert | 410/47 |

Primary Examiner—Joseph F. Peters, Jr.
Assistant Examiner—M. J. Hill
Attorney, Agent, or Firm—Carothers and Carothers

[57] ABSTRACT

A supporting bracket is secured to the housing of a tightener for a load binder used with a truck. The bracket extends outwardly in overlapping engagement with the upper surface of the inwardly projecting flange of a truck bed side rail and is slidable along the rail. A sprocket and ratchet are rigidly mounted on a shaft rotatably mounted in the housing, and a pawl connected to the housing engages the ratchet. When the shaft is rotated a sprocket chain, one end of which is fastened to the load binder, is wound on the sprocket to tighten the load binder. A shock absorber and tension-indicating block is disposed between the housing and the side rail.

10 Claims, 5 Drawing Figures

TRUCK LOAD BINDER TIGHTENER

In many cases the loads carried by trucks have to be tied down to the truck beds. This is done by binders, such as chains, that extend across the load with their ends fastened to opposite sides of the truck bed or its frame. For example, a different chain may be secured at one end to each rub rail of the truck, and the free ends of the chains connected above the load to a take-up device that tightens the chains. Or, one end of a binder may be attached to one side of a truck with the opposite end connected to a rotatable device that can be turned to take up the slack in the binder to tighten it. An unfortunate fact of life is that there is a considerable amount of stealing of truck binder tighteners, some by truckers and some by third parties who then sell them to truckers. In most cases the tighteners can be easily removed from trucks, a situation that promotes the thefts.

It is among the objects of this invention to provide a truck load binder tightener which is permanently connected to a truck, which can be adjusted to any desired position along the length of the truck, which provides shock absorbing for the binder, which allows a binder to be tightened from ground level, and which provides visible indication of the tension on the binder.

The preferred embodiment of the invention is illustrated in the accompanying drawings, in which FIG. 1 is a front view of the tightener with a fragment of a truck bed showing;

Figure 1:
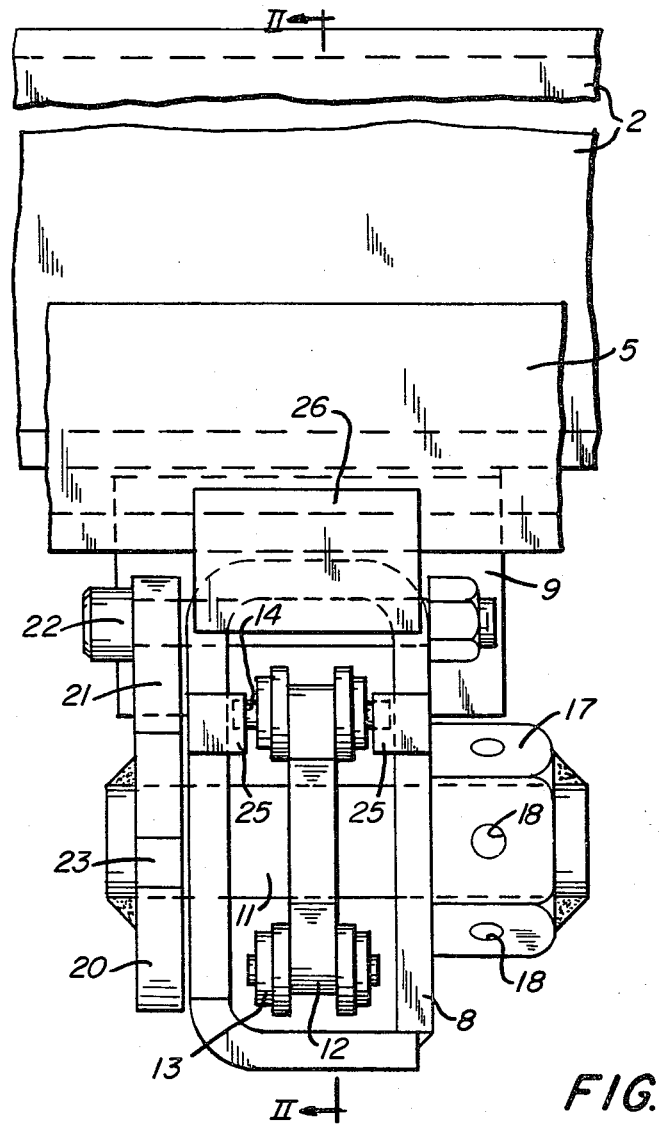
Figure 2:
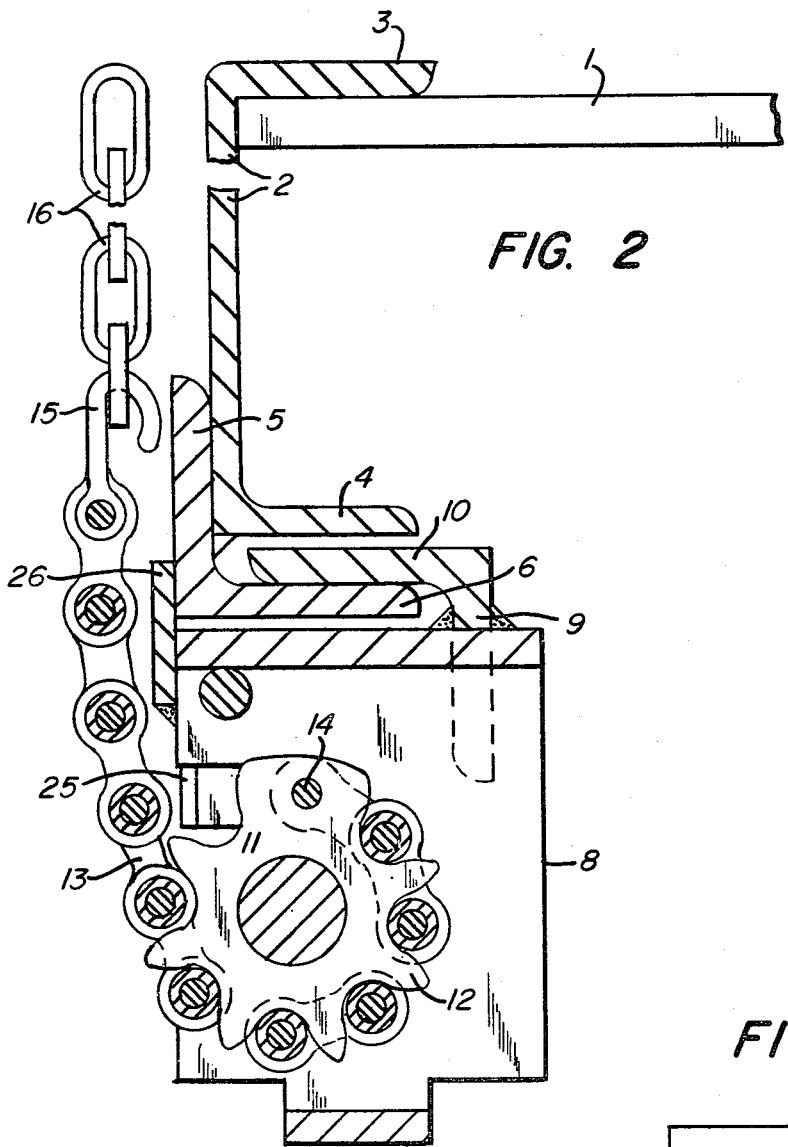
FIG. 2 is a vertical section taken on the line II—II of FIG. 1.

Referring to FIGS. 1 and 2 of the drawings, the bed 1 of a truck has along each side a rail 2 that may be in the form of a channel with inwardly extending upper and lower flanges 3 and 4. Welded to the outer surface of the channel is the vertical flange of another rail 5 that is in the form of an angle bar, the horizontal flange 6 of which extends inwardly beneath rail flange 4 and is spaced from it. This second rail may extend the full length of the first rail 2.

Below the two rails there is the housing 8 of a load binder tightener. This housing has spaced parallel side walls connected by a top wall and a bottom wall, although the bottom wall can be omitted if desired. The housing can be formed in any suitable manner, such as from a metal plate bent into rectangular shape. Welded to the top of the housing is a braket, preferably in the form of a short angle bar, the downwardly extending flange 9 of which is provided with a central notch so that the flange straddles the housing. The horizontal flange 10 of this bracket extends out between flanges 4 and 6 of the two side rails and is supported by the lower rail. Extending through the opposite sides of the housing is a rotatable shaft 11, the ends of which project from the housing. Rigidly mounted on the shaft between the sides of the housing is a sprocket 12. A sprocket chain 13 fits the sprocket, and one end of the chain is fastened to the sprocket by means of a pin 14 extending through the sprocket and the chain. The chain extends out of the lower part of the housing and is provided with a hook 15 (FIG. 2) or other means for attaching it to one end of a load-binding chain 16, the opposite end of which is fastened to the opposite side of the truck.

As shown in FIG. 1, one end of shaft 11 is formed for receiving a tool for turning the shaft. For this purpose, a nut 17 may be welded on the end of the shaft, preferably a hexagonal nut so that an air-driven socket wrench can be applied to the nut to turn the shaft in order to wind the chain around the sprocket and thereby tighten the load binder. The nut and shaft may also be provided with a through passage 18, in which a bar or rod can be inserted for turning the shaft, if desired. If desired, instead of a nut, a hexagonal end may be formed on the shaft.

Figure 3:
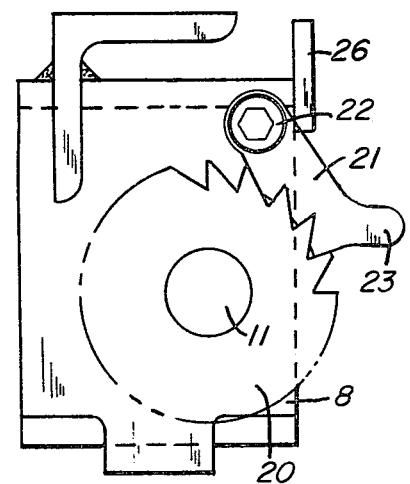
FIG. 3 is a fragmentary side view of the tightener showing a pawl and a ratchet.

To hold the sprocket in any position to which it is turned, a ratchet 20 is rigidly mounted on the opposite end of the shaft, as shown in FIGS. 1 and 3. The ratchet is engaged by a pawl 21 that is pivotally mounted on a pin 22 extending through the upper part of the housing. The pawl is provided with a projection 23 to enable it to be lifted from the ratchet in order to permit the chain to be unwound from the sprocket.

To prevent the sprocket from being turned 360° or more, which would cause the sprocket end of the chain to push the upwardly extending part of the chain away from the sprocket, the pin 14 that attaches the chain to the sprocket projects from the chain and will engage a pair of stops 25 before the sprocket can be turned 360°. These stops preferably are tongues that are struck out of the outer edges of the housing side walls and bent inwardly toward each other into the path of the pin.

After the tightener has been put in place, a retaining member, such as a metal plate 26, is welded to the outer face of the housing and extends upwardly into overlapping engagement with the lower rail. This prevents the tightener from being moved inwardly to disconnect it from the rail. Nevertheless, the tightener can be slid along the rail to any desired position, according to where it is desired to locate the load binder. In spite of its adjustability, this binder tightener is highly resistant to theft, which is a great advantage. If desired, plate 26 can be welded to the housing before the tightener is put in place. In such a case a piece is cut out of the bottom flange of the lower rail to permit the housing bracket to be passed up through the flange, and then the cut out piece is welded back in place.

If there are no interfering cross members between the side channels 2, the lower rail 5 can be omitted and the housing bracket flange 10 placed on top of the lower flange 4 of the channel 2.

In case this binder tightener is used with a binder chain that extends down through a hole in the truck bed, so that there is no reason to move the tightener along the truck, the tightener can be welded in permanent position. Also, if one end of the binder chain is permanently connected to the truck adjacent the sprocket and the other end of the chain can be disconnected from the truck, when the chain is not in use most of it can be lowered through the truck bed into a receptacle that can be suspended from the truck close to the tightener. When the chain is in place across a load, it can be tightened by hooking the sprocket chain into the binding chain and turning the sprocket to pull on the binding chain.

Figure 5:
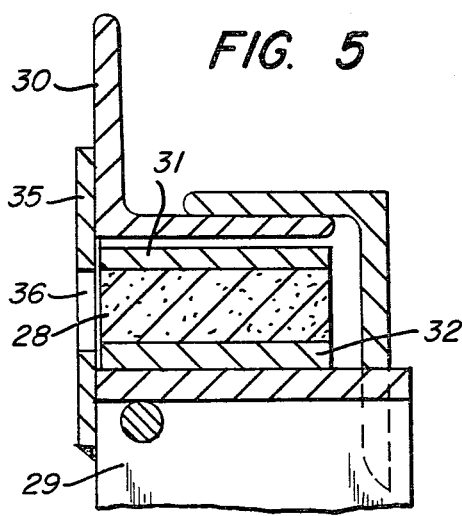
FIG. 5 is a vertical section of FIG. 4.
Figure 4:
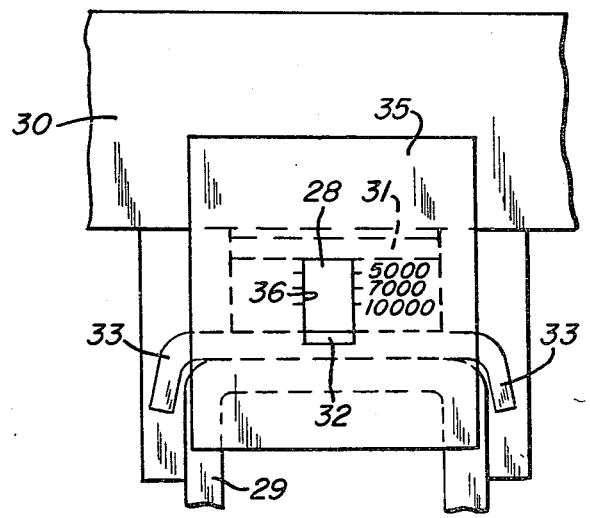
FIG. 4 is a fragmentary front view of a modification.

In the modification shown in FIGS. 4 and 5 a resilient member, which may be a spring, a resilient block 28 or the like, is inserted between the top of the tightener housing 29 and the bottom of the overlying rail 30. The block is made of a suitable composition of rubber or the like that can be compressed under great pressure and yet expand to its normal size when the pressure is released. This block preferably is secured to top and bottom metal plates 31 and 32, with the lower plate provided with lateral extensions 33 bent down over the sides of the housing to hold the block in place. The block is squeezed tightly between the housing and rail when the sprocket is turned to tighten a load binder and will serve as a shock absorber that will protect the binder from being overstressed when the truck travels over roads that may tend to cause the load to bounce.

Another purpose of block 28 is to aid in determining the amount of tension that the tightener exerts on a load binder. This is accomplished by providing the vertical plate 35 with a vertical slot 36, through which the lower front edge of top plate 31 can be seen. At the side of the slot the plate 35 is provided with vertically spaced graduation marks to indicate the tension on the chain. For example, when the block 28 has been compressed enough to put 5000 pounds tension on the load binder, the upper graduation mark, marked 5000 lbs., will be in line with the bottom of plate 31. The graduation marks below the 5000 lb. mark may indicate tension increase in predetermined increments, with the lowest mark indicating 10,000 lbs. tension, for example, when the block is compressed enough to bring that mark up to the bottom of plate 31. If no such top plate is used, the indicating marks can be positioned for lining up with the lower surface of the lower rail 30. In either case, the trucker who operates the binder tightener can see how much tension he is applying on the load binder.

If it is desired to be able to take up more chain than is permitted when one end of a chain is secured to the sprocket, the connection of the chain to the sprocket can be omitted so that as the sprocket is rotated the chain will feed out the back of the tightener housing.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a truck bed having a side rail extending along the bed and provided at its bottom with a flange projecting inwardly beneath the bed, of a load binder tightener comprising a housing having spaced parallel side walls, a bracket secured to the housing and extending above it, the bracket extending outwardly in overlapping engagement with the upper surface of said rail flange, means secured to the housing for limiting movement thereof inwardly to prevent removal of said bracket from said rail flange, a shaft rotatably mounted in said housing side walls and projecting from at least one of said side walls and formed to receive a tool for turning the shaft, a sprocket rigidly mounted on the shaft between said side walls, a ratchet rigidly mounted on said shaft, a pawl pivotally connected to said housing and engaging the ratchet, a sprocket chain engaging the sprocket, whereby the chain can be wound on the sprocket when said shaft is rotated, a second rail above said first-mentioned rail and having at its bottom an inwardly projecting flange spaced above said first-mentioned flange, said first-mentioned rail being an angle bar with a vertical flange secured to the outer side of said second rail, and said bracket extending outwardly between said spaced inwardly projecting rail flanges.

2. The combination recited in claim 1, in which said bracket is an angle bar with a vertical flange secured to said housing and with a horizontal flange overlapping said rail flange.

3. The combination recited in claim 1, in which said movement-limiting means is a rigid member extending upwardly from said housing and overlapping the outer surface of said rail.

4. The combination recited in claim 1, including a resilient member disposed between the top of said housing and the bottom of said rail, said housing being movable upwardly and compressing said resilient member when tension is put on said chain.

5. The combination recited in claim 4, in which said movement-limiting means is a vertical plate extending upwardly from said housing and overlapping the outer surface of said rail, said plate being provided with a vertical slot and with tension-indicating marks beside the slot.

6. The combination recited in claim 5, in which said resilient member is a resilient block, and a plate rests on top of said block and is visible through said slot.

7. The combination with a truck bed having a side rail extending along the bed and provided at its bottom with a flange projecting inwardly beneath the bed, of a load binder tightener comprising a housing having spaced parallel side walls, a bracket secured to the housing and extending above it, the bracket extending outwardly in overlapping engagement with the upper surface of said rail flange, means secured to the housing for limiting movement thereof inwardly to prevent removal of said bracket from said rail flange, a shaft rotatably mounted in said housing side walls and projecting from at least one of said side walls and formed to receive a tool for turning the shaft, a sprocket rigidly mounted on the shaft between said side walls, a ratchet rigidly mounted on said shaft, a pawl pivotally connected to said housing and engaging the ratchet, a sprocket chain engaging the sprocket, whereby the chain can be wound on the sprocket when said shaft is rotated, said tightener including a pin extending through said sprocket and the adjoining end of the chain with the ends of the pin projecting from the chain, and stops extending toward each other from said housing side walls for engagement by the ends of said pin when the sprocket has been turned a predetermined number of degrees less than 360°.

8. The combination recited in claim 7, in which said stops are tongues struck out of the outer edges of said housing side walls and bent toward each other.

9. The combination with a truck bed having a side rail extending along the bed and provided at its bottom with a flange projecting inwardly beneath the bed, of a load binder tightener comprising a housing having spaced parallel side walls, a bracket secured to the housing and extending above it, the bracket extending outwardly in overlapping engagement with the upper surface of said rail flange, means secured to the housing for limiting movement thereof inwardly to prevent removal of said bracket from said rail flange, a shaft rotatably mounted in said housing side walls and projecting from at least one of said side walls and formed to receive a tool for turning the shaft, a sprocket rigidly mounted on the shaft between said side walls, a ratchet rigidly mounted on said shaft, a pawl pivotally connected to said housing and engaging the ratchet, a sprocket chain engaging the sprocket, whereby the chain can be wound on the sprocket when said shaft is rotated, said shaft projecting from both of said housing side walls, and said ratchet is rigidly mounted on one of the projecting ends of the shaft, said tightener including a pin mounted in said housing and extending across said ratchet, and said pawl being pivotally mounted on said pin.

10. The combination with a truck bed having a side rail extending along the bed and provided at its bottom with a flange projecting inwardly beneath the bed, of a load binder tightener comprising a housing having spaced parallel side walls, an angle bar with a vertical flange secured to said housing and with a horizontal flange overlapping the upper surface of said rail flange and slidable lengthwise thereof, a plate extending upwardly from said housing and overlapping the outer surface of said rail for limiting movement of the housing inwardly to prevent removal of said angle bar from said rail flange, a shaft rotatably mounted in said housing side walls and projecting therefrom, one end of the shaft being formed to receive a tool for turning the shaft, a ratchet rigidly mounted on the opposite end of the shaft, a sprocket rigidly mounted on the shaft between said side walls, a pin mounted in said housing and extending across the ratchet, a pawl pivotally mounted on the pin and engaging the ratchet, a sprocket chain, a pin extending through said sprocket and the adjoining end of the chain and projecting from opposite sides of the chain, and stops extending toward each other from said housing side walls for engagement by the ends of said chain pin when the sprocket has been turned a predetermined number of degrees less than 360°.

* * * * *